US006962087B2

(12) United States Patent
Wray (10) Patent No.: US 6,962,087 B2
(45) Date of Patent: Nov. 8, 2005

(54) ELECTROMAGNETIC FLOW METER (75) Inventor: Troy Wray, Gloucestershire (GB)

(73) Assignee: ABB Limited, Cheshire (GB)

( * ) Notice: Subject to any disclaimer, the term of this patent is extended or adjusted under 35 U.S.C. 154(b) by 5 days.

(21) Appl. No.: 10/817,765

(22) Filed: Apr. 2, 2004

(65) Prior Publication Data

US 2004/0260484 A1 Dec. 23, 2004

(30) Foreign Application Priority Data

Apr. 2, 2003 (GB) .............................. 0307637
Jul. 3, 2003 (GB) .............................. 0315612

(51) Int. Cl.[7] .............................. G01F 1/58
(52) U.S. Cl. .................. 73/861.12; 702/38; 702/45; 702/50
(58) Field of Search .............. 73/861.17, 861.12, 73/861.16, 861.11; 702/38, 45, 50, 100

(56) References Cited

U.S. PATENT DOCUMENTS

| 4,644,799 A | | 2/1987 | Tomita | |
|---|---|---|---|---|
| 4,651,286 A | * | 3/1987 | Fukai et al. | 702/45 |
| 4,709,583 A | * | 12/1987 | De Paepe et al. | 73/861.17 |
| 4,953,408 A | * | 9/1990 | Appel et al. | 73/861.16 |
| 5,621,177 A | * | 4/1997 | Torimaru | 73/861.16 |
| 6,173,616 B1 | * | 1/2001 | Tomita | 73/861.17 |
| 6,634,238 B2 | * | 10/2003 | Budmiger | 73/861.17 |
| 6,845,330 B2 | * | 1/2005 | Okuda et al. | 702/38 |
| 2003/0029250 A1 | | 2/2003 | Keech et al. | |

FOREIGN PATENT DOCUMENTS

| GB | 1586417 A | 3/1981 |
|---|---|---|
| GB | 2084740 A | 4/1982 |
| GB | 2380798 A | 4/2003 |

* cited by examiner

Primary Examiner—Edward Lefkowitz
Assistant Examiner—Jewel V. Thompson
(74) Attorney, Agent, or Firm—Knobbe Martens Olson & Bear LLP (57) ABSTRACT There is described herein a method of obtaining a measure of flow from an electromagnetic flow meter having at least one field generating coil and potential sensing electrodes. A composite excitation waveform is applied to the field-generating coil. The composite excitation waveform comprises at least two frequency components and a plurality of frequency components are simultaneously present for at least a portion of the waveform. The potential sensed by the potential sensing electrodes is sampled to produce a sampled output and the sampled output is correlated with a composite waveform based on the composite excitation waveform. The result of the correlating is used to derive a measure of flow.

14 Claims, 8 Drawing Sheets

ELECTROMAGNETIC FLOW METER

CROSS-REFERENCE TO RELATED APPLICATION

This application is related to U.S. patent application Ser. No.10/817,327, filed on the same day as the present application, having the same inventor as the present application, and entitled "ELECTROMAGNETIC FLOW METER". The disclosure of the above-described filed application is hereby incorporated by reference.

BACKGROUND OF THE INVENTION

The present invention relates to electromagnetic flow meters. However, aspects of signal processing techniques disclosed herein may be more broadly applied. The operating principles of Electromagnetic Flow Meters are well known, discussed for example in GB-A-2,380,798.

Where the sensing electrodes are in contact with the fluid, due to electrochemical or other effects, a DC potential is usually present across the electrodes even when there is no coil excitation, i.e. no field. That component of the signal is independent of the flow. This inhibits the ability to determine the flow in a static fashion. To overcome this some form of dynamic excitation to the coils is typically provided in order to generate a dynamic component at the electrodes that can be differentiated from the background DC (or slowly varying) bias signal. This dynamic signal is normally pulsed DC or an AC signal.

The bias signal will not generally be static. It may drift randomly with time, flow and temperature. In some applications, particularly for non-homogeneous fluids with inclusions, the signal may contain large amplitude decaying exponential components, for example in paper pulp and slurry applications, as discrete charged particles occasionally touch the electrodes, changing the voltage instantaneously and this voltage then discharges exponentially to the (drifting) baseline.

The energy can be spread across a wide frequency range but most applications have significant low frequency noise and this is often more problematic due to the nature of the signal processing.

Therefore, one way to obtain flow measurements which are less susceptible to such effects might be to use a high frequency excitation, above most of the noise effects. It is found that a frequency above about 1 kHz would for most practical purposes exclude most bias effects. However, using such a frequency would introduce its own problems. Most notably, the magnetic circuit of the flow meter is less stable at the higher frequencies. One factor that contributes to this is that the losses in the magnetic circuit, which become more significant at higher frequencies, are quite temperature dependent. Thus, for a given excitation, the field strength generated may vary unpredictably. This can be exacerbated because the excitation coils are usually positioned outside a steel shell of the flow meter. A search coil can be used to measure the actual field generated but this adds significant cost and manufacturing difficulties.

The 'roll off' of the sensor head at these higher frequencies leads to an uncertainty in the sensitivity of the sensor and to variations in the phase between the field (and hence the electrode signal) and the drive current. It is known to use a moderate frequency (e.g. 70 Hz) sinusoidal excitation and to demodulate the electrode signal synchronously with the excitation signal. Quite apart from other considerations, the phase angle at which the demodulation is (should be) carried out is not constant and requires either manual or automatic adjustment.

To summarise the problems a lower drive frequency can give much better sensor stability but measurements are more easily corrupted by the bias drift and the effect of inclusions in the fluid. A further important problem is that a low excitation frequency limits the rate at which new measurements can be updated—it gives a low flow measurement bandwidth. A higher frequency assists in distinguishing wanted signals from unwanted and also allows a more acceptable higher flow measurement bandwidth but the sensor characteristics will not be so precisely defined and are less stable. The frequency chosen is therefore normally a compromise for a particular set of circumstances.

These problems have been previously addressed and it has been proposed in the assignee's earlier filed UK patent application no. 0116168.6 to excite a meter with two frequencies simultaneously or quasi-simultaneously. Each frequency component is separately extracted and a combined measurement obtained in such a way as to enhance the better properties of each measurement. A drawback is that measurement rate is still limited by the lowest frequency, as explained in more detail below.

SUMMARY OF CERTAIN INVENTIVE EMBODIMENTS

According to a first aspect the invention provides a method of obtaining a measure of flow from an electromagnetic flow meter comprising applying a composite excitation waveform comprising a plurality of frequency components; receiving an output from the meter; and correlating sampled output data from the meter with a composite correlation waveform based on the composite excitation waveform to derive a measure of flow.

In this method, by taking the novel step of correlating with a composite waveform, rather than the conventional method of correlating each frequency component with a sine wave, a number of advantages can be obtained. Although the composite waveform will effectively contain multiple frequency components, it has been found that it is not necessary to process each component separately and thus measurement rate is not limited by the lowest frequency component. Furthermore, additional information is obtained from the combination of the components (the shape of the waveform) as well as the components themselves.

Preferably the meter is excited with a composite excitation waveform obtained by combining at least two frequency components; in this way the composite waveform can easily be selected to contain frequency components which excite desired properties, for example a relatively high and relatively low frequency. The composite waveform will preferably not be completely sinusoidal. The composite waveform preferably is substantially devoid of sharp turning points (these are associated with numerous high frequencies which may behave unpredictably). The composite waveform is preferably digitally synthesised. The frequency components are preferably combined at pre-determined, preferably similar, for example within a range of minimum to maximum of 1 to 5 or less, preferably 1 to 3 or less, amplitudes. The amplitudes (and phases) may be chosen to enhance the prominence of turning points in the waveform.

The composite waveform preferably has a plurality of turning points within a predetermined measurement window period; it is found that multiple turning points or "features" may assist in obtaining accuracy.

More than two components may be used and provision of three or four components may enhance accuracy, by giving more features to the waveform. However, it is preferable that the number of components is limited, for example to less than about 10, preferably less than 5 components and/or that the highest frequency component with significant amplitude has a frequency no greater than about 1 kHz. Diminishing returns are achieved with greater than about 5 components, but in some cases a few more components may be used.

Whilst an arbitrary waveform can theoretically be approximated by an infinite number of sine and cosine waveforms, such approximations tend to require a large number of harmonics to converge accurately and this implies a large number of high frequencies which would behave unpredictably in a real meter. By limiting the number of components, most preferably by synthesising the composite waveform from a discrete set of components, each having a chosen amplitude, the effects of the individual components and the overall response becomes more predictable.

Although the higher frequency may be an integral multiple of the lower frequency, it is not necessary for the frequencies to be harmonically related. Even when two frequencies are integral multiples of each other, it is not necessary to include intervening harmonics. Thus the composite waveform may comprise at least two frequencies which are not harmonically related to each other. Alternatively, the composite waveform may comprise two frequencies of which a higher frequency is a harmonic of a lower frequency but in which at least one intervening harmonic of the lower frequency is substantially absent. Preferably, when the higher frequency is an odd harmonic, at least one intervening odd harmonic may be substantially absent and/or when the higher frequency is an even harmonic, at least one intervening even harmonic may be substantially absent.

An advantageous feature is that correlation may be performed over a window which does not contain an integer number of periods of all (or any) frequency components. The window may be shorter than the period of the lowest frequency component; this enables measurement to be obtained with a higher bandwidth than the lowest frequency.

Correlating preferably comprises determining a measure of closeness of fit. A factor may be derived from said correlating and a measure of flow may be derived from the factor. A measure of a trend within a correlation window may be determined and a measure of measurement accuracy may be determined from the measure of trend.

With traditional methods of measurement, it is difficult to reduce sensitivity to trends in the baseline reading, e.g. due to zero offsets. Pursuant to the invention, it has been appreciated that in fact, particularly with the techniques disclosed herein (but other techniques which give multiple measurement may be used), trends (particularly baseline trends) in the meter data can usefully be measured and can be used to determine or improve meter accuracy.

According to a further aspect, the invention provides a method of processing the output of an electromagnetic flow meter comprising correlating sampled output data with a signal to determine a measure of flow and a measure of a trend within the data over a measurement period.

The trend may provide data about the meter or may simply account for interference during the measurement period.

A measure of a linear trend may be determined. Additionally or alternatively a measure of an exponential trend (e.g. a decaying exponential) may be determined. Advantageously an exponential or linear trend may be approximated by a polynomial. In a preferred arrangement a low order polynomial trend, preferably second or third order, is fitted to the data—this can effectively remove linear or exponential trends without interfering substantially with fitting of the data. The sampled output data may be fitted with reference data comprising an expected signal multiplied by an unknown factor and a trend of unknown gradient (or polynomial coefficients) to determine values for the factor and for the gradient (or polynomial) which gives the best fit according to a predetermined fitting method, preferably a least squares fitting method. Using higher order polynomials to model trends trends leads to diminishing returns. Preferably a measure of flow is determined from the value of the factor. Preferably a measure of confidence or accuracy is determined from the gradient. The predetermined fitting method may comprise determining a sum of squares of differences between the reference data and sampled output data. The reference data may include a constant unknown offset. A value for the offset may be determined to improve the fit. However, advantageously, the offset value may be determined but the measure of accuracy or confidence is based primarily on the value of the gradient. Calibration parameters for the meter may be stored, the method further comprising adjusting at least one calibration parameter for the meter based on a plurality of measurements of trend or accuracy or confidence.

According to a further aspect, the invention may provide a method of operating a flow meter comprising storing calibration parameters for the meter and adjusting at least one stored parameter as successive flow measurements are derived based on a plurality of measures of accuracy of the flow measurements.

Preferably at least one stored calibration parameter is adjusted to reduce a measure of trend or to improve a measure of accuracy or confidence based on successive measurements.

Calibration parameters may include at least one of phase and amplitude response. Preferably calibration parameters are stored for multiple frequency components. At least one calibration parameter for a first frequency component may be adjusted in response to measurements whereas at least one corresponding calibration parameter for a second frequency component may retained at an initial (e.g. factory calibration) setting. The first frequency component may have a higher frequency than the second frequency component. Preferably calibration parameters for the lowest frequency component are all kept constant.

Weighted filtering may be performed on measurements of flow based on the measure of trend or accuracy or confidence.

BRIEF DESCRIPTION OF THE DRAWINGS

An embodiment of the invention will now be described, by way of example only, with reference to the accompanying drawings in which.

DETAILED DESCRIPTION OF CERTAIN INVENTIVE EMBODIMENTS

The method underlying the invention and a background method will first be explained.

As noted above, single frequency measurement in an electromagnetic flow meter is a compromise. To assist in understanding the invention, an earlier technique will first be explained in more detail which applies two frequencies simultaneously and then resolves the two components of the electrode signal separately. This gives some of the benefits of each frequency. Such a system is disclosed in the assignees earlier filed UK patent application no. 0116168.6, hereby incorporated by reference.

As a specific example, consider a system using 10 Hz and 70 Hz excitation simultaneously. At 10 Hz, the sensor characteristics can be assumed to be stable but the results will be influenced by noise. At 70 Hz, the signal is easier to recover but since the sensor characteristics are less well defined, the flow signal is correspondingly less well defined.

A basic system could use the zero measurement from the 10 Hz 'channel' as the reference zero. The 70 Hz channel could then be used to obtain a measurement with the benefits of the higher frequency excitation and the zero would be 'anchored' to the 10 Hz value.

Doing the 10 Hz correlation in the presence of the 70 Hz component is not problematic; the higher frequency is an integral multiple of the lower frequency (this is a constraint of the method) and an integer number of cycles of an interfering frequency in the correlation window does not cause a problem. However, performing the 70 Hz correlation is problematic. It is necessary to arrange that the correlation window to contain an integer number of both the 70 Hz and the 10 Hz signals in order to get an accurate result. This means that the window length for the 70 Hz signal should be at least 0.1 seconds and hence measurement bandwidth is limited to that of the lower frequency, 10 Hz. Thus, although some noise may have been reduced and stability gained, the measurement bandwidth is still limited by the lower frequency.

The assignee's earlier filed application in fact discloses a more sophisticated technique with complementary high and low pass filters but again the measurement bandwidth is limited by the lower frequency.

In conventional multi-frequency analysis, the fact that superposition applies (or is assumed to apply) is a useful basis for simplifying calculations; it allows the components to be resolved independently even if applied simultaneously as if the others were not there (although this is subject to some limitations).

In the present invention, a composite waveform is applied, and this can be considered to be applying multiple excitation frequencies simultaneously (the coil excitation is the sum of a number of discrete sine waves). An important difference between embodiments of the invention and prior multi-frequency techniques is that the electrode signal is analysed for all components simultaneously by correlating the actual electrode signal with the expected electrode signal, rather than by detecting each frequency component separately.

Figure 1:
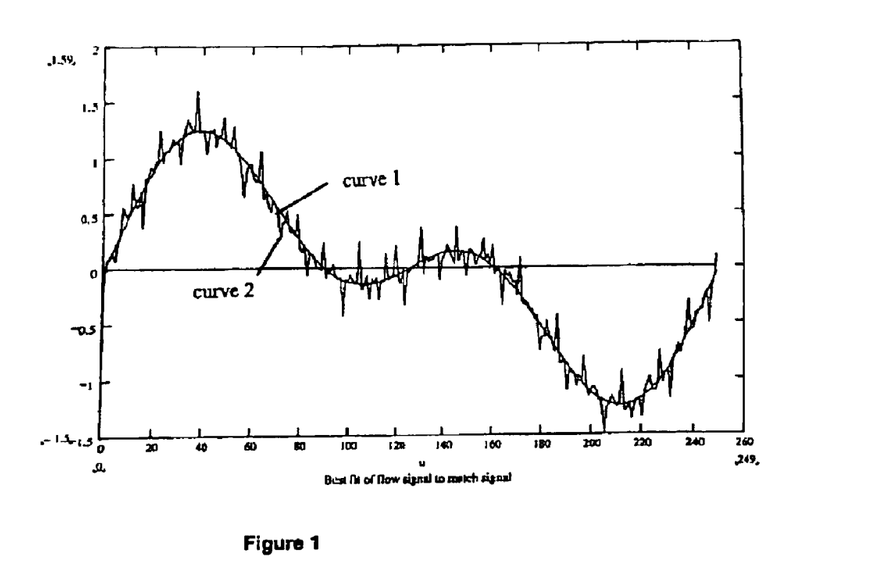
FIG. 1 shows an example time window with two components for the case of two frequency components and a good fit.

To assist in explaining the invention an example window in time is shown in FIG. 1.

The "curve 1" line shows the expected electrode signal, the "curve 2" noisy data is the actual electrode signal. The magnitude of the correlation is then the magnitude of the (curve 1) curve that gives the best fit to the (curve 2) data. In the figure, the fit is already optimal.

Note that in this example, there are two frequency components and both have an integer number of cycles in the window. In this case, resolving the two frequencies separately would give similar results to treating the composite waveform as one signal. In this case, the inventive method may offer an advantage in the processing but it is noted that the measurement should be similar to that obtained by treating the components separately.

Figure 2:
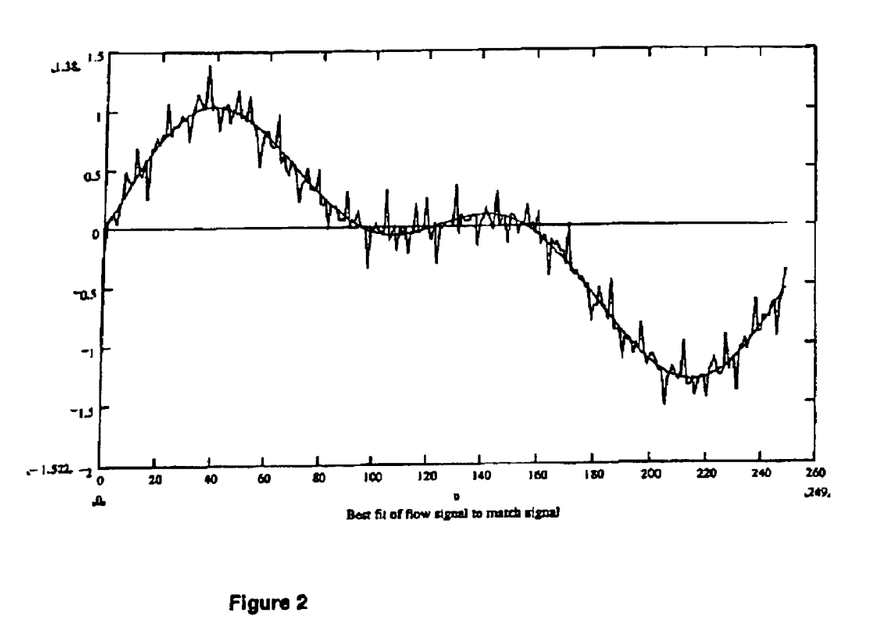
FIG. 2 shows another example of a good fit with four frequency components.

FIG. 2 shows another example where the inventive method gives a significant advantage. In this example, there are four frequency components, two of them containing less than one complete cycle in the window.

Provided the expected signal is known then one of the great benefits of this technique is that it does not depend on any or all of the components having an integer number of cycles within the window.

Conceptually, one may look for the 'pattern' (curve 1) in the data (curve 2). In principle, the more complex curve 1, the more distinct a pattern being looking for.

Relative to the window above, the four frequency components have frequencies 1, 2, 0.5 and 0.25. The four frequencies are 40 Hz (1 cycle in the window) 80 Hz, 20 Hz and 10 Hz. In this example, the frequencies are harmonically related. In practice, using a digital signal processor (DSP), it may often be convenient to produce frequencies which are integer sub-multiples of a common frequency and this will often mean that the higher frequencies are harmonics of lower frequencies but it is not necessary for the components to be related.

The ability to fit without requiring a whole number of cycles of all of the frequencies provides significant advantages.

It is advantageous from a 'distinctiveness' point of view to have several turning points in the waveform within the window, hence the choice of frequencies and window length.

Figure 5:
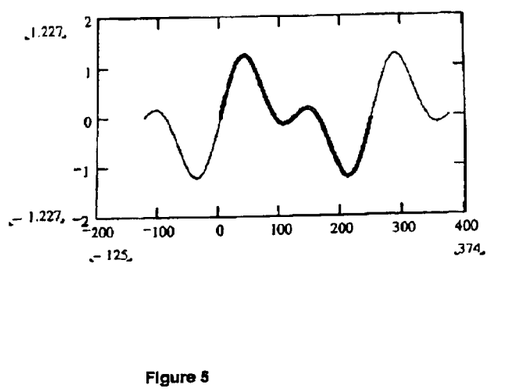
FIG. 5 shows the expected "pure" signal from the electrodes of an electromagnetic flow meter of an embodiment.

Ignoring zero offsets and noise for the moment then the expected signal from the electrodes should be of the form shown in FIG. 5 and the amplitude should be directly proportional to the value of flow. For example, if FIG. 5 represents the received signal at a flow of 1 m/s then a flow of 0.5 m/s should give half the amplitude, a flow of 0 m/s would give a flat line and a flow of −1 m/s would give the same signal as FIG. 5 but inverted.

Note that this waveform shape is not intended to be fixed or indeed optimal. As noted above, the example happens to use harmonically related frequencies. This is not necessary and may not be the most advantageous arrangement. In any event it should be recognised that the pattern being matched will change from window to window.

In this case of no zero offsets, the waveform can be fitted using simple and well known Least Squares; the amplitude of the red curve is the one that minimises the sum of the square of the errors between the two sets of the data.

If the expected signal is $P_i$ and the received signal is represented by $Y_i$ then one should find the factor F such that:

$$\Sigma(Y_i - F \cdot P_i)^2$$

is a minimum. In this case, the only degree of freedom is F and one may simply choose F to minimise the SSE.

However, working with real world data, it has been recognised that the signal being fitted is continually corrupted by a varying offset and the offset may vary within the window being fitted.

Two extra degrees of freedom have been introduced, namely a slope and an offset. Now the SSE equation that is to be minimised becomes:

$$\sum_i (Y_i - F \cdot P_i - M \cdot i - C)$$

Figure 4:
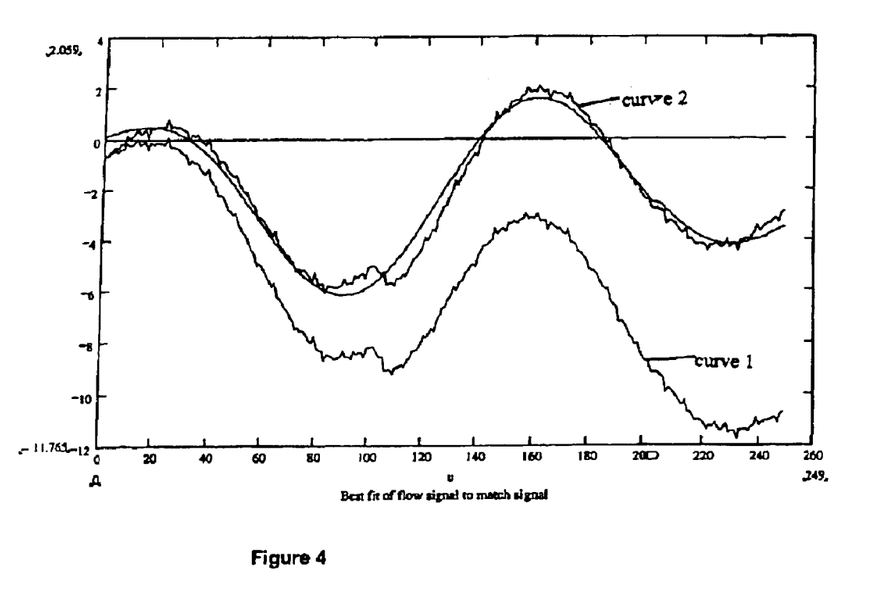
FIG. 4 illustrates removal of a trend from data.

Referring to FIG. 4, curve 1 represents the incoming data with a clear trend on it. Curve 2 represents the same data after fitting using the above equation to remove the trend.

This idea will seem deceptively simple on first inspection. Indeed the technique could be applied to single frequency excitation systems to achieve a certain amount of robustness to the incoming signal having a superimposed trend.

However, trying to apply the technique to a multi-frequency system where the signals are analysed separately would be problematic. It would only work provided the expected signal does not have a trend within the window. This means that there could only be whole number of cycles of any applied frequencies within the window.

This technique works so well because the composite signal is fit directly and simultaneously. Where it demonstrates its power very effectively is on the 'tails' of exponentials. As mentioned earlier, the electrode signal could have a trend that is nothing to do with the flow. Most frequently this would be either a lowish frequency drift or the tail of an exponential. In the above graph, the magenta curve is the measured data. It has a negative going trend that would lead to a poor fit with the red reference curve. However, by doing the fit with the slope and offset degrees of freedom, a good fit is obtained (the blue data has the trend removed).

It should be noted that this is very different to just removing any trend before the fit because even the expected signal has an inherent trend by virtue of not having a whole number of cycles of the waveforms in the window and so simply attempting to remove a trend would corrupt the data.

In the mathematics, the scale factor that gives the best fit (peak to trough) is the flow signal and the slope and offset can be thought of as the best trend that can be applied to the signal to make the peaks and troughs coincide.

The scale factor is F, the slope is M and the offset is C. The offset C is thrown away, it offers little informational value. However, M gives surprisingly useful information. Although at first sight M would be expected to be no longer needed once the fit is achieved, M in fact gives a very useful indication of the amount of corruption seen by the system during the measurement window.

The difference between a poor fit (above) and a good fit (the previous two graphs) is very apparent by eye. However, mathematically, the quality can be much harder to judge in a reliable but computationally simple manner. This is because there is a moderate level of random noise on the data anyway and even a perfect fit has a moderate rms error. A further aspect of this invention provides a method to determine the quality of fit. This is done in a way that can be seen mathematically to enhance the distinction between FIGS. 2 and 3.

We now consider a practical system. It is a sampled data system. The sensor is being excited with 10, 20, 40 and 80 Hz (these may be conveniently generated e.g. as submultiples of a 20 kHz or 20.48 kHz DSP sampling clock frequency with 250 or 256 samples respectively for the 80 Hz signal and correspondingly more for the lower frequencies). The acquisition system is acquiring samples continuously but the processing is done on a window of data at a time.

The window length is one cycle of 40 Hz (25 mS) but the window is moved along half a cycle at a time so the windows overlap (it is an advantageous but optional feature that windows overlap, although it is not necessary to use exactly half a window increment). While this does not directly increase the bandwidth, it does give a higher data rate making subsequent filtering easier.

From the result of each window is a flow value F, a slope value M and an error estimate for the fit of the waveform within that window. Sometimes, the M and error estimates will suggest that the value of F is accurate and can be trusted highly. Other times M and/or the error estimate will suggest that the value of F could well be corrupt because there was excessive trend in the data or the fit just was not very good.

This confidence value can be used to 'weight' the data for filtering purposes. Again, this filtering has proven to be very effective on real world data. Different filtering and weighting algorithms may be used, the choice may depend on application.

A simple algorithm is to hold the last value if the confidence is too low. A monitor can be provided to ensure that the algorithm adapts if the overall reading confidence for all the windows is low.

In a more advanced algorithm, trend analysis is used to give a better guess of the value if the confidence in the current reading is low. In this respect, the filter could behave like a Kalman filter.

Equally, the M value/error estimate can be used to give a SEVAL like output e.g. clear, blurred, dazzled as proposed by M. P. Henry et al.

The ability to fit the incoming signal and remove a trend is a unique feature of this kind of system, which can be applied to other measurements, but would not have an equivalent with a single frequency excitation.

The system depends on knowing the amplitude and phase of the incoming components. This information represents the frequency response of the sensor. However, it is appreciated that this is not necessarily constant. An algorithm will now be described that can automatically adapt to changing sensor characteristics.

An outer loop is responsible for updating the matrix of coefficients representing the frequency response. By suitable averaging of the residual errors of each window, any error in one of the coefficients becomes apparent.

The fit that gives the best possible fit while keeping the amplitude ratio and phase of the components fixed is used. However, if the fit could be improved by allowing the matrix coefficients to be adjusted (preferably by a small amount below a threshold) and the degree of adjustment is consistent over a number of windows then the adjustment is made.

Preferably the lower frequency, here 10 Hz coefficients are kept fixed (but in some cases may be subject to a very low limit of adjustment). Limits can be placed on the amount by which the other components can be adjusted. Limits may include a limit on the maximum total deviation of a given coefficient from a starting value and/or a maximum adjustment of a given coefficient in a given adjustment interval and/or a maximum total or weighted combination of adjustment of coefficients and/or a combination of the preceding limits.

A method of determining measurement error will now be explained, referring back to FIG. 1. It is clear by eye that there would be no better fit than the one shown. However, the SSE (Sum of the Squared Errors) is still significant because of the (relatively) high frequency noise on the data being fitted. Now referring to FIG. 3, by eye, it is clear that the fit is not very good. However, the SSE is not very different from that for FIG. 1. For illustration, the SSE for FIG. 1 is 0.121 while for FIG. 3 the SSE is 0.269, a little over a factor of 2. Yet the fit is very much worse. This illustrates the normal difficulty in measuring accuracy of measurement.

Figure 3:
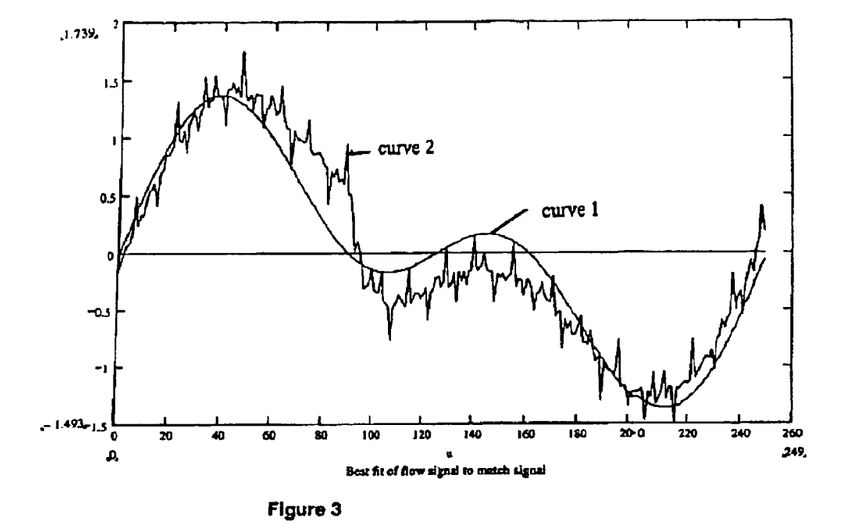
FIG. 3 shows an example similar to FIG. 2 but exhibiting a poor fit.

Since it is desired to use the measurement error as an aid to weighted filtering, it is preferred that there be more 'contrast' (by which is meant a mathematically identifiable distinction) between the error values for FIG. 1 and FIG. 3. This can be achieved by substantially ignoring the high frequency residuals and considering primarily the low frequency residuals. Conceptually therefore the residuals could be filtered with a low pass filter before performing the SSE calculations. Alternatively, it would be possible to do an FFT of the residuals and measure only components below a certain frequency. Both of these methods may be effective, but performing an FFT at least is computationally intensive.

A computationally simple but highly effective method for obtaining much more contrast will be described. This is based on the recognition that the residual errors in FIG. 3 that are desired to measure are low frequency and that, as a result, the error spends a long time on the same side of the curve (ie either positive or negative). In contrast, the high frequency residuals average to zero over a very short interval.

Various embodiments of the method divide the window into a plurality of intervals, preferably at least about 4, preferably no more than about 20, typically 5–10, here 8 intervals. For each of these intervals, the residual is summed algebraically. Referring to FIG. 1 it is clear that this algebraic sum would be close to zero over any of the intervals whereas for FIG. 3 it would be far from zero (either large and negative or large and positive) over most of the intervals.

To get a final error figure for the window, the absolute value of each of the 8 interval errors is summed. This is because the summation within any interval could be positive or negative and an algebraic sum would largely cancel out.

There is thus provided a method of determining error between a signal and a corresponding reference signal, each signal comprising a first plurality of sampled values in a sampling interval, the method comprising:

defining a second plurality of sub intervals, each sub interval containing a respective subset of the first plurality of sampled values;
determining an algebraic sum for each sub interval of the difference between signal sample values and reference signal sample values;
determining an absolute sum of the algebraic sums for each sub interval as an error estimate for the sampling interval.

The calculation may include other filtering or weighting and the error estimate may be further processed, but one point of interest is that the step of algebraic summing comprises a calculation or operation in which differences of opposite sign substantially cancel and the step of absolute summing comprises an operation or calculation in which the algebraic sums add constructively. In place of an absolute sum, a sum of square might be used—this would increase the effect of a single large error on the end result.

Although the units are different, the error using this technique is 2.203 and 48.033 for FIGS. 1 and 3 respectively; a much higher contrast (20:1 instead of 2:1).

Dividing the window into 8 intervals is very appropriate in this example because of the frequencies present (ie ratios of 1, 2, 4 and 8). If different frequencies were chosen then these intervals could be optimised accordingly.

Figure 7:
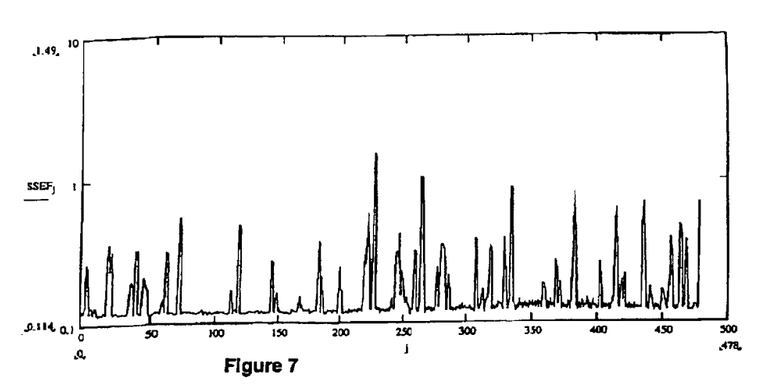
FIG. 7 illustrates error processing using an SSE approach.

FIG. 7 shows the SSE approach. The graph represents 6 seconds worth of 25 ms windows. Although there is high contrast between the peaks and the 'baseline', these peaks only represent the very worst readings.

Figure 8:
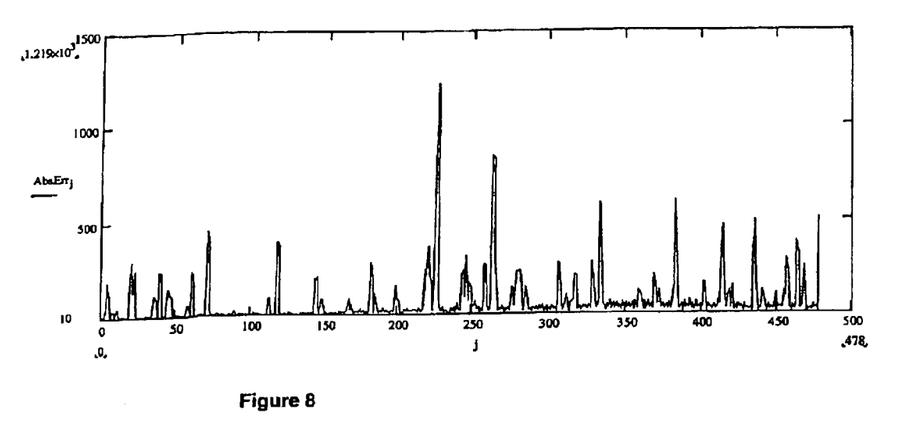
FIG. 8 illustrates an enhanced method for determining errors.

FIG. 8 shows the enhanced method for determining errors. Here, the baseline is much lower and much better contrast exists between good and bad readings.

Figure 9:
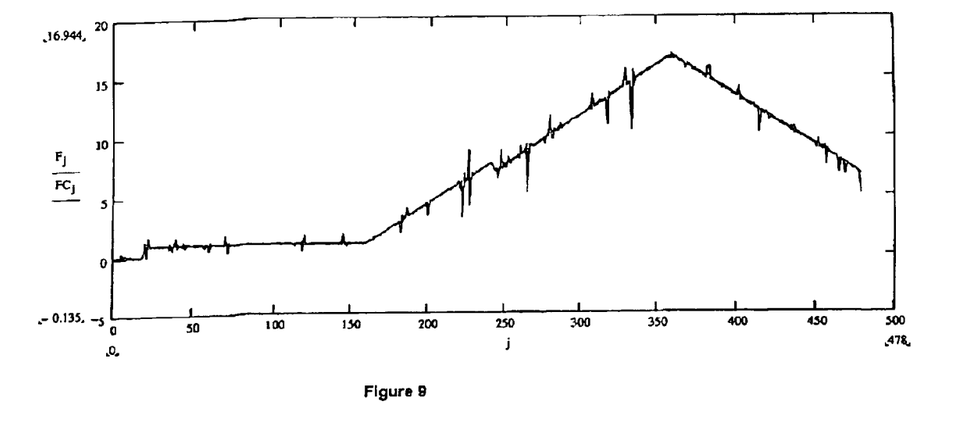
FIG. 9 shows a flow signal as determined by an LSE fit algorithm.

On these two graphs, every point represents a processed window. FIG. 9 shows the flow signal as determined by the LSE fit algorithm. The final stage of the processing now is to use the error measurement from graph 8 to filter the data in graph 9. Since it is clear that the high peaks in FIG. 8 represent points with high measurement errors, one can 'filter out' these points with a suitable algorithm.

Figure 10:
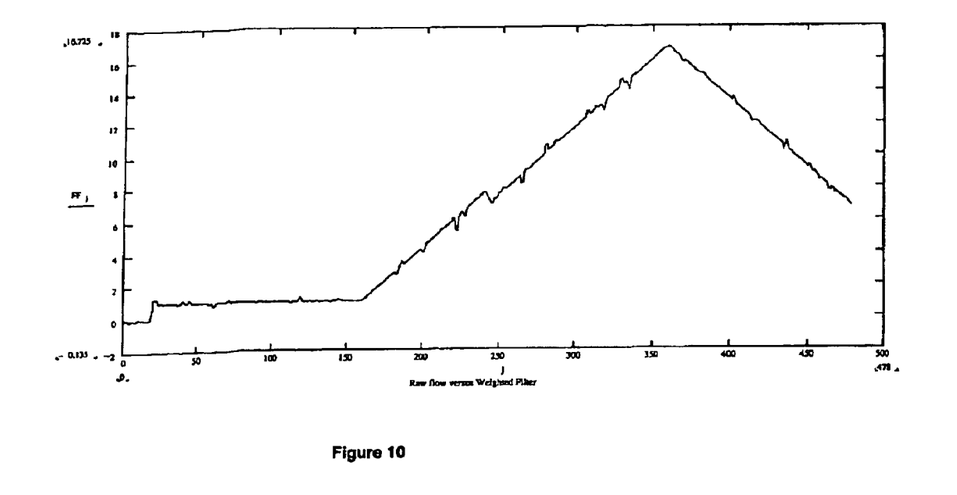
FIG. 10 shows flow after filtering.

FIG. 10 shows the flow after filtering.

Figure 11:
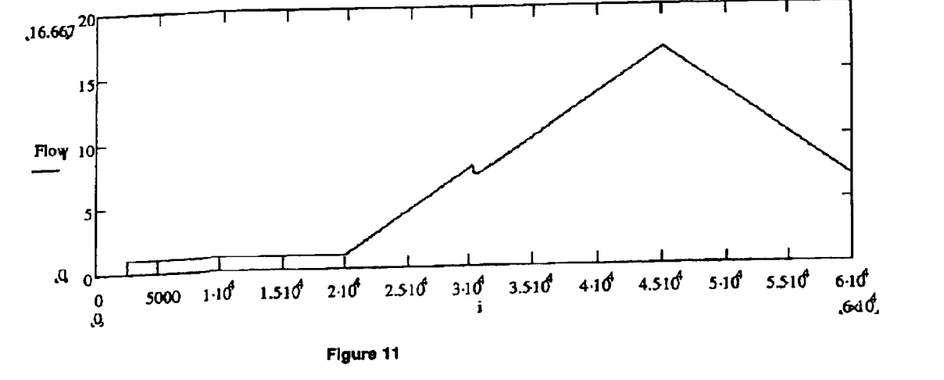
FIG. 11 shows a flow profile.
Figure 15:
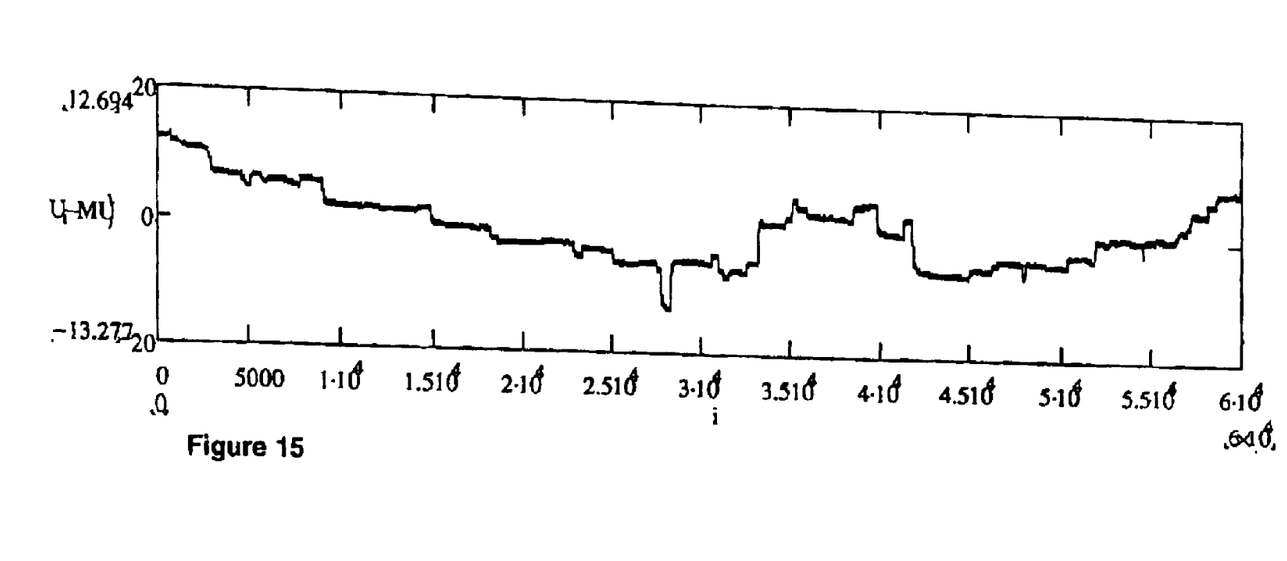
FIG. 15 shows noise added (over a 6 second window)

FIG. 11 shows the flow profile used for the examples in this example. FIG. 15 shows the noise added. Although the results are partially simulated, the noise added to the data is from a real flow meter in a real application.

Figure 12:
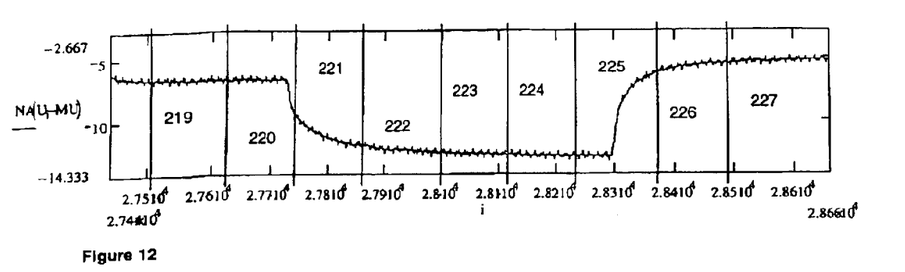
FIG. 12 shows the added noise zoomed in so the total window is about 0.2 seconds long.

FIG. 12 shows the added noise zoomed in (the total window is about 0.2 seconds long).

Figure 13:
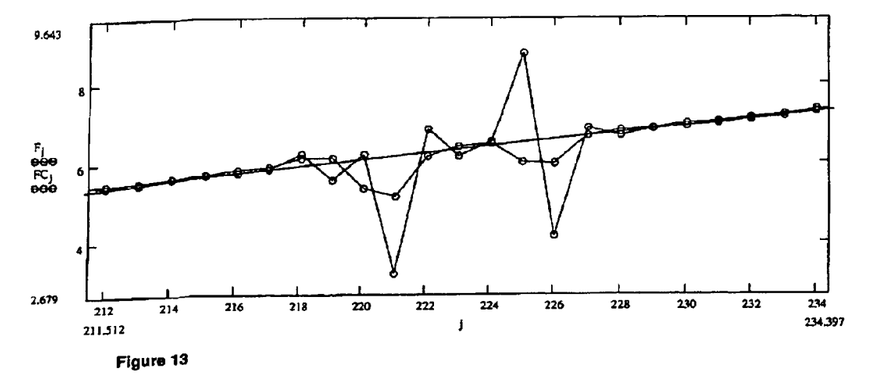
FIG. 13 shows derived flow values.

FIG. 13 shows the derived flow values for approximately the same interval. The intervals in FIG. 12 show the window numbers and correspond to the x axis values of FIG. 13.

Figure 14:
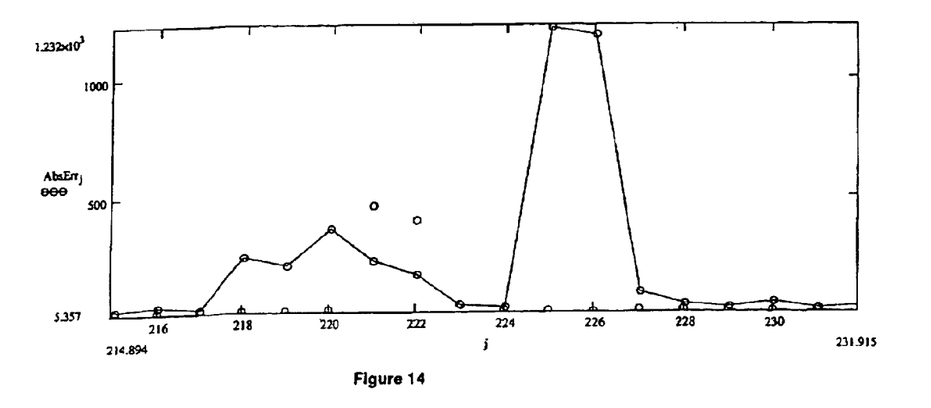
FIG. 14 shows the error estimates for each of several windows.

FIG. 14 shows the error estimates for each of the windows, demonstrating a sensitive indicator of when the flow estimate is not perfect. Note that the flow reading is sometimes good even though the error indicator is high. This is logical because the error indicator is really indicating the uncertainty in the flow reading, at least in a qualitative way.

Figure 6:
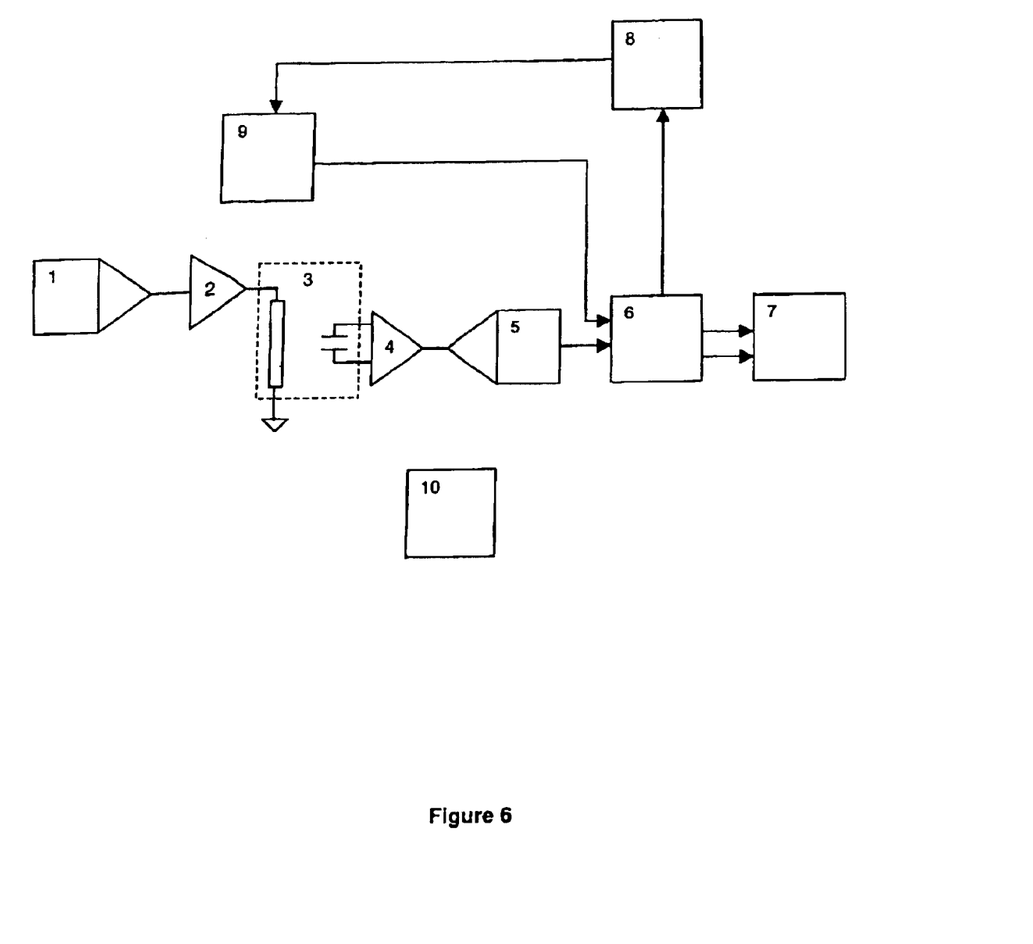
FIG. 6 is a schematic diagram of apparatus according to an embodiment.

Apparatus embodying the method will now be described with reference to FIG. 6.

The Microprocessor 10 maintains a 'time' variable for the purpose of calculating drive signals and expected signals. In this embodiment, the microprocessor calculates a signal that is the sum of four predetermined amplitude (here equal amplitude), distinct frequency sinewaves. This signal is applied to the drive coil in the sensor 3 via power amplifier 2. The electrode signals are amplified 4 and converted into discrete samples by ADC 5. Software modules running on the microprocessor implements the method described.

The mathematical drive signal is transformed by the frequency response coefficients in transformation module 9 in order to determine the expected signal back from the sensor. In other words, knowing the signal applied to the drive coil and knowing the transfer function of the sensor, this module calculates the waveform expected back from the sensor in the absence of perturbations.

Correlation module 6 performs the correlation or LSE fitting. The results of this fitting are at least a flow signal and a 'confidence' value that can be used to assist in the weighted filter module 7. As an enhancement, the results from the correlation module 6 can also be used by an adaptive adjustment module 8. Such a module, if present, monitors the quality of fit over a period of time and decides whether the coefficients used by transformation module 9 need adjustment, subject to predetermined constraints.

Embodiments of the invention provide one or more of the following novel features: Using multiple frequencies simultaneously, fitting multiple frequencies simultaneously, weighted filtering and adjusting coefficients dynamically.

Modifications of detail may be made and features disclosed herein may be provided independently or in other combinations.

What is claimed is:

1. A method of obtaining a measure of flow from an electromagnetic flow meter having at least one field generating coil and potential sensing electrodes, the method comprising:

applying, to the at least one field generating coil, a composite excitation waveform comprising at least two frequency components, wherein a plurality of frequency components are simultaneously present for at least a portion of the waveform;

sampling a potential sensed by the potential sensing electrodes to produce a sampled output;

correlating the sampled output with a composite waveform based on the composite excitation waveform; and deriving a measure of flow based on the result of the correlating.

2. A method according to claim 1, wherein the waveform comprises a set of components, each having a pre-specified amplitude and frequency.

3. A method according to claim 1, wherein the composite waveform is non-sinusoidal.

4. A method according to claim 1, wherein the composite waveform is digitally synthesised.

5. A method according to claim 1, wherein correlation is performed over a window which does not contain an integer number of periods of all frequency components.

6. A method according to claim 5, wherein the window is shorter than the period of the lowest frequency component.

7. A method according to claim 1, wherein correlating comprises determining a measure of closeness of fit.

8. A method according to claim 1, further comprising deriving a factor from said correlating, and deriving a measure of flow from the factor.

9. A method according to claim 1, further comprising determining a measure of a trend within a correlation window.

10. A method according to claim 9, further comprising subtracting the measure of trend from the output sample.

11. A method according to claim 9, further comprising determining a measure of measurement accuracy from the measure of trend.

12. A method according to claim 10, wherein the processing signal is the output of an electromagnetic flow meter.

13. A method according to claim 10, wherein the physical quantity is flow.

14. A method according to claim 10, further comprising determining a measure of a linear trend.

* * * * *